May 22, 1956  H. F. KAUPPI  2,746,694
FISHING REEL

Filed June 3, 1955  2 Sheets-Sheet 1

INVENTOR.
HILMER F. KAUPPI,
BY
McMorrow, Berman & Davidson
ATTORNEYS.

May 22, 1956  H. F. KAUPPI  2,746,694
FISHING REEL
Filed June 3, 1955  2 Sheets-Sheet 2
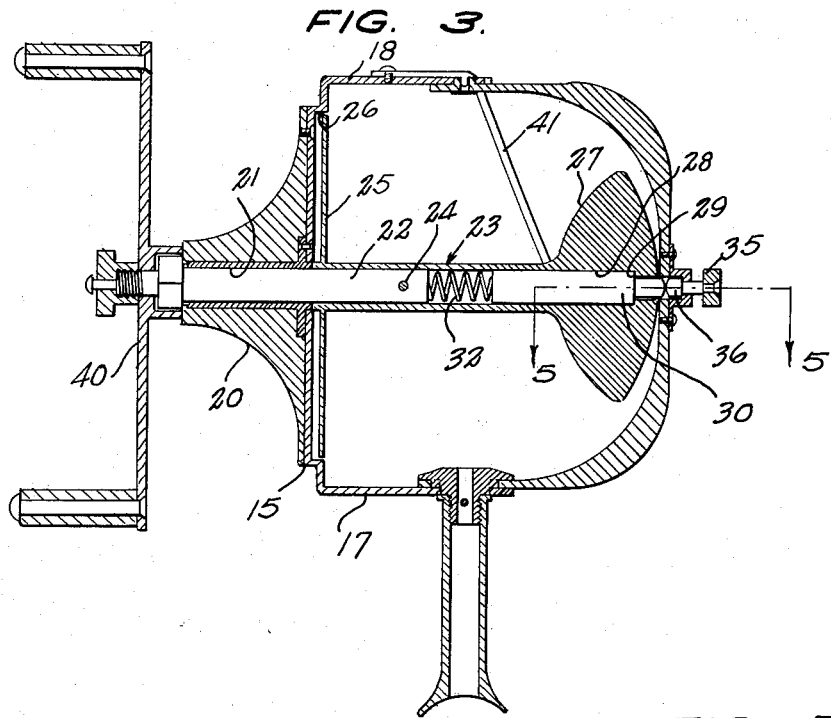
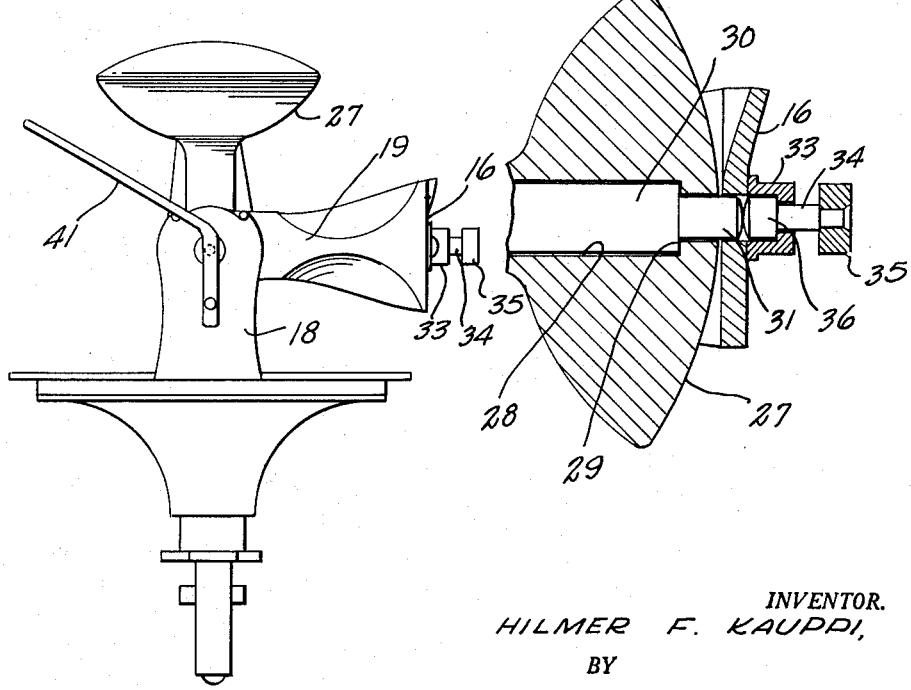
INVENTOR.
HILMER F. KAUPPI,
BY
McMorrow, Berman + Davidson
ATTORNEYS.

United States Patent Office 2,746,694
Patented May 22, 1956

2,746,694

FISHING REEL

Hilmer F. Kauppi, Calumet, Mich.

Application June 3, 1955, Serial No. 512,943

3 Claims. (Cl. 242—84.4)

The present invention relates to fishing reels of the type known as "spinning reels" which permit the line to be cast from one end of the reel spool without rotation of the reel spool.

The primary object of the present invention is to provide a fishing reel which can be used both for spin casting and for regular casting without any change of parts.

Another object of the present invention is to provide a fishing reel which may be used to wind up the fishing line with the reel spool axis arranged transversely of the extended line and may be used to cast the line therefrom with the spool axis parallel to the extended line.

A further object of the present invention is to provide a combined standard fishing reel and a spinning reel of light weight construction, one having few parts, one economical to manufacture and assemble, and one highly effective in action.

These and other objects and advantages of the present invention will be fully apparent from the following description when taken in connection with the annexed drawings, in which:

Figure 3 is an elevational view in cross-section as seen on line 3—3 of Figure 1, Figure 4 is a top plan view similar to Figure 1 showing the reel spool moved to a position for spin casting, and Figure 5 is a partial vertical view greatly enlarged as taken on line 5—5 of Figure 3.

Figure 1:
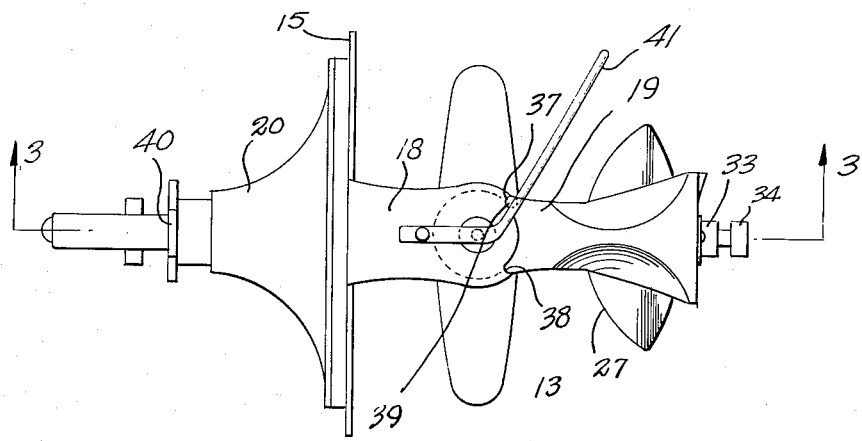
Figure 1 is a top plan view of the present invention.
Figure 2:
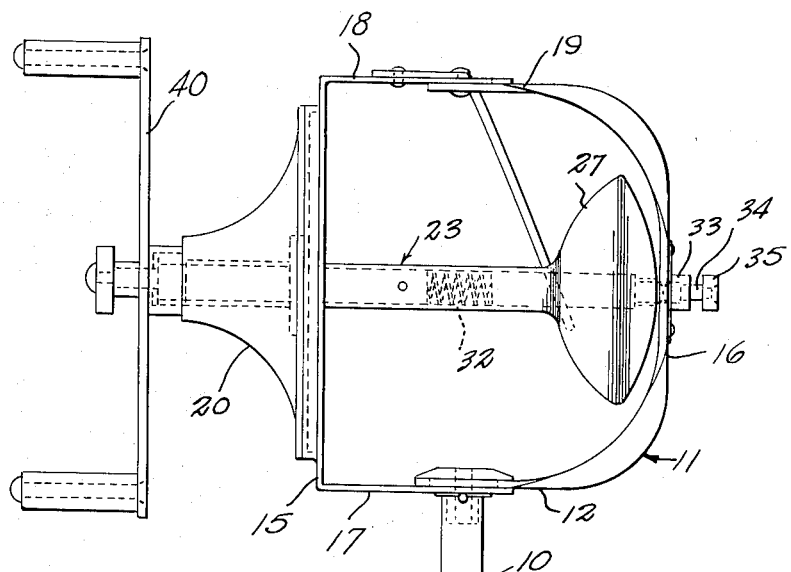
Figure 2 is an elevational view.

Referring in greater detail to the drawings in which like numerals indicate like parts throughout the several views, the present invention consists in a fishing reel comprising an upright post 10, a U-shaped bracket 11 arranged with its legs 12 and 13 in vertically spaced relation with the free end of the lower leg 12 fixedly secured to the upper end of the post 10, the lower end of the post being provided with a plate member 13 adapted to be clamped or otherwise secured to a fishing pole, the latter being shown in dotted lines in Figure 2 and indicated by the reference numeral 14.

A vertically disposed reel plate 15 is arranged in face to face spaced relation with respect to the bight 16 of the bracket 11 and has a pair of flanges 17 and 18 projecting perpendicularly therefrom and arranged in superimposed spaced relation one on each side of the plate 15 with the upper flange 18 connected by its end to the upper leg 19 of the bracket 11 at the free end of the latter and the lower flange 17 pivotally connected to the post 10 so that the plate 15 swings about a vertical axis from the face to face position with respect to the bight 16 to a position transversely of the bight 16.

On the nonconfronting face of the reel plate 15 is a bearing support 20 having a sleeve bearing 21 extending therethrough and through which extends the shaft 22 of the reel, the reel spool 23 being secured to the shaft 22 by means of a pin 24 extending transversely through the core of the reel and the end portion of the shaft 22.

One spool end of the reel spool 23 is a flat disc 25 rotating within a recess 26 formed in the reel plate 15 and the other spool end is rounded, as indicated by the reference numeral 27 so that the fishing line will run smoothly thereover when that spool end is moved from its position adjacent the bight 16 of the bracket 11 to a position away from the bight, as shown in Figure 4.

The bore 28 of the core of the reel spool 23 is provided with a shoulder 29 serving as a stop for the shouldered plug 30, the reduced end of which projects through the outer end of the reel spool 23 and is received in an aperture 31 in the inner face of the bight 16. A spring 32 positioned within the bore 29 biases the plug 30 outwardly.

A sleeve 33 is secured to the outer face of the bight 16 over the aperture 31 and forms a support for a plunger 34 which has a button 35 on its outer end and an enlarged portion 36 on its inner end. The one flange 18 of the plate 15 is provided with stops 37 and 38 receiving an upstanding pin 39 projecting upwardly on the leg 19 of the bracket 11. The other end of the shaft 22 where it projects from the bearing support 20 is secured to a handle 40 by means of which the reel spool is rotated to wind a fishing line thereon.

In use, the fishing reel of the present invention is secured to the upper side of a fishing rod adjacent the handle of the latter and a fishing line is wound thereon with the reel spool axis disposed transversely of the fishing rod and the enlarged end 36 of the plug 30 supported in the aperture 31. After winding a line on the reel spool, pressure of a finger on the button 35 compresses the spring 32 and releases the reel spool end from its support in the bracket, allowing it to turn so that the line may be cast freely over the end of the reel spool. The stops 37 and 38 limit the pivotal movement of the reel relative to the bracket to 90° from the position at which the axis of rotation of the reel spool is perpendicular to the bight of the bracket and transversely of the fishing rod to a position at which the axis of rotation of the reel spool is parallel to the fishing rod and transversely of the bracket 11.

An arm 41 projecting outwardly at an angle over the reel spool 23 with one end secured to the flange 18 forms a means by which the line may be directed to the reel spool 23, guiding the line as it is rewound upon the reel spool so that it lies in smooth layers thereon.

What is claimed is:

1. In a fishing reel, an upright post, a U-shaped bracket arranged with its legs in vertical spaced relation and having the lower one of its legs fixedly secured to said post at the upper end of the latter, means on the lower end of said post for attaching said post to a fishing rod, a vertically-disposed reel plate arranged in face to face spaced relation with respect to the bight of said bracket, a pair of flanges projecting perpendicularly from said plate, one of said flanges being pivotally connected to the upper leg of said bracket and the other of said flanges being connected to said post to thereby permit said plate to be moved from the face to face position with respect to said bight to a position transversely of said bight, a line-carrying reel spool mounted on said plate between said flanges for rotational movement about an axis perpendicular to said plate, means operatively connected to said spool for rotating the latter, and releasable interengaging means on said bight and on said spool for supporting the adjacent end of said spool when said plate is in the face to face position.

2. In a fishing reel, an upright post, a U-shaped bracket arranged with its legs in vertical spaced relation and having the lower one of its legs fixedly secured to said post at the upper end of the latter, means on the lower end of said post for attaching said post to a fishing rod, a vertically-disposed reel plate arranged in face to face spaced relation with respect to the bight of said bracket, a pair of flanges projecting perpendicularly from said plate, one of said flanges being pivotally connected to the upper leg of said bracket and the other of said flanges being pivotally connected to said post to thereby permit said plate to be moved from the face to face position with respect to said bight to a position transversely of said bight, a line-carrying reel spool mounted on said plate between said flanges for rotational movement about an axis perpendicular to said plate, means operatively connected to said spool for rotating the latter, said spool having a bore extending inwardly from the end adjacent said bight to a point intermediately of the ends of said spool, and a plug slidably mounted in said bore with one end projectable therefrom, said bight of said bracket being provided with an aperture receivably engageable with said plug one end for supporting said spool end when said plate is in the face to face position.

3. In a fishing reel, an upright post, a U-shaped bracket arranged with its legs in vertical spaced relation and having the lower end of its legs fixedly secured to said post at the upper end of the latter, means on the lower end of said post for attaching said post to a fishing rod, a vertically-disposed reel plate arranged in face to face spaced relation with respect to the bight of said bracket, a pair of flanges projecting perpendicularly from said plate, one of said flanges being pivotally connected to the upper leg of said bracket and the other of said flanges being pivotally connected to said post to thereby permit said plate to be moved from the face to face position with respect to said bight to a position transversely of said bight, a line-carrying reel spool mounted on said plate between said flanges for rotational movement about an axis perpendicular to said plate, means operatively connected to said spool for rotating the latter, said spool having a bore extending inwardly from the end adjacent said bight to a point intermediately of the ends of said spool, a plug slidably mounted in said bore with one end projectable therefrom, and spring means biasing said plug so that said one end thereof projects from said bore, said bight of said bracket being provided with an aperture receivably engageable with said plug one end for supporting said spool end when said plate is in the face to face position.

No references cited.